(12) United States Patent
Desnijder et al.

(10) Patent No.: US 7,322,174 B2
(45) Date of Patent: Jan. 29, 2008

(54) CROP PROCESSOR ROLL ASSEMBLY

(75) Inventors: Dirk J. Desnijder, Wondelgem (BE); André S. N. C. Ducoulombier, Wevelgem (BE)

(73) Assignee: CNH America LLC, New Holland, PA (US)

( * ) Notice: Subject to any disclaimer, the term of this patent is extended or adjusted under 35 U.S.C. 154(b) by 169 days.

(21) Appl. No.: 11/247,499

(22) Filed: Oct. 11, 2005

(65) Prior Publication Data
US 2006/0090443 A1    May 4, 2006

(30) Foreign Application Priority Data
Oct. 25, 2004    (GB) .................... 0423639.4

(51) Int. Cl.
*A01D 61/00* (2006.01)
(52) U.S. Cl. .................... 56/16 B; 56/DIG. 1
(58) Field of Classification Search ............. 56/14.6, 56/16.4 A, 16.4 B, 16.4 C, 16.4 D, 16.4 R, 56/16.5, DIG. 1; 460/28, 30
See application file for complete search history.

(56) References Cited

U.S. PATENT DOCUMENTS

| | | | | |
|---|---|---|---|---|
| 2,117,494 A | * | 5/1938 | Neighbour | 460/46 |
| 4,580,395 A | * | 4/1986 | Castoldi | 56/16.4 B |
| 5,070,682 A | * | 12/1991 | Bohman | 56/10.2 J |
| 6,131,837 A | * | 10/2000 | Wanner et al. | 241/101.742 |

FOREIGN PATENT DOCUMENTS

| | | |
|---|---|---|
| EP | 0664077 A1 | 7/1995 |
| WO | WO 01/47342 A1 | 7/2001 |

* cited by examiner

*Primary Examiner*—Thomas B. Will
*Assistant Examiner*—Jamie L McGowan
(74) *Attorney, Agent, or Firm*—Michael G. Harms; John William Stader; Patrick M. Sheldrake

(57) ABSTRACT

A forage harvester is provided with a crop processor roll assembly that comprises a shaft and a removable crop processor roll having a fluted surface for cracking maize kernels. The roll has end plates, to which the shaft is connected by sleeves. The interior of the sleeve is joined to the shaft by two interference or press fits, and to the roll by a third press fit.

12 Claims, 3 Drawing Sheets

CROP PROCESSOR ROLL ASSEMBLY

FIELD OF THE INVENTION

The present invention relates to crop processor roll assemblies for cracking grain kernels in a forage harvester. In particular, it pertains to a means for mounting an exchangeable crop processor roll to the shaft that supports and drives the roll.

BACKGROUND OF THE INVENTION

Forage harvesters are well known in the art. They are commonly used for comminuting crop material, such as grass or maize, for silage purposes. With grass-like materials, it is sufficient to slit the crop material, i.e., the stems of the plants are cut to length using a cutter, e.g. a rotating knife drum. When cutting maize, the cobs may be slit to a smaller size but a substantial portion of the kernels remain intact. This reduces the nutrient value of the silaged crop as the kernels are more-or-less indigestible if not cracked.

In order to facilitate the complete digestion by the cattle of the crop material, including the maize kernels, the outer skin of the kernels has to be cracked or cut. Commonly, this is realized by a set of closely adjacent, co-operating compressor rolls with fluted surfaces, installed behind the knife drum and in front of the blower or accelerator, as shown for example in EP-A-0 177 995 and EP-A-0 680 687.

The crop flow between the rolls inevitably will blunt the fluted surfaces of the rolls, thus increasing the space between the rolls and reducing the cutting effect on the kernels. In order to alleviate the costs caused by the replacement of worn-out rolls, it has been proposed to use crop processor assemblies that allow for the exchange of the roll body or a section thereof alone, while preserving the shaft or shafts, and their bearings. Such assemblies have been disclosed by DE-A-43 21 898 and EP-A-0 664 077.

A constant problem with this type of exchangeable rolls is the reliable connection of the roll to the drive shaft. DE-A43 21 898, EP-A-0 995 352 and U.S. Pat. No. 6,131,837 propose to use conical rings for clamping the roll surface to the shaft. This type of connection is capable of withstanding the forces that occur during normal processing of the maize material. However, it is possible that lumps of harder material, such as stones or wood parts, are ingested by the machine and fed to the crop processor's rolls. The ensuing shocks are transmitted upon the conical shaft connections, which eventually will settle and turn loose.

Hence, there is a need for a firmer connection of the crop processor roll to the shaft, which connection however should not impede the possibility of removing and replacing the roll, whenever its surface has become blunt.

SUMMARY OF THE INVENTION

According to the invention, there is provided a crop processor roll assembly for a forage harvester, said roll assembly comprising: a shaft; a crop processor roll having a generally cylindrical surface for cracking kernels in crop material engaged by said surface and at least one end plate provided with a bore for receiving therein an end of said shaft; at least one removable mounting element for mounting said crop processor roll to said shaft; wherein said mounting element comprises a sleeve, the interior of which is joined to said shaft by an inner interference fit; and the exterior of said sleeve is joined to said roll by an outer interference fit.

This double press fit provides for a sturdy connection between the roll and the shaft, which is not disturbed by the passage of foreign objects. The outer interference fit may be provided between the sleeve and the end plate, while the inner fit is located inward or outward from the end plate, thereby providing capability of elastic deformation to the sleeve. This capability may further be enhanced by a recess below the outer interference fit, which recess forms an annular cavity between the sleeve and the shaft. Preferably, the outer interference fit is lighter than the inner interference fit. The latter may be p/H or P/h fit, as defined in ISO Standard 286-1. The outer fit may be a h/N or H/n fit.

Advantageously, the sleeve may be joined to the shaft by a further interference fit, e.g., on the other side of the cavity and the surrounding outer fit. This fit may also be a fit lighter than said inner fit, such as a h/N or H/n fit.

DETAILED DESCRIPTION OF THE EXEMPLARY EMBODIMENTS

The present invention will be described with reference to a certain embodiment and certain drawings but the invention is not limited thereto, but only by the claims. The drawings are schematic. The terms "front", "rear", "forward", "rearward", "right" and "left" used throughout the specification are determined with respect to the normal direction of movement of the machine in operation and are not to be construed as limiting terms.

Figure 1:
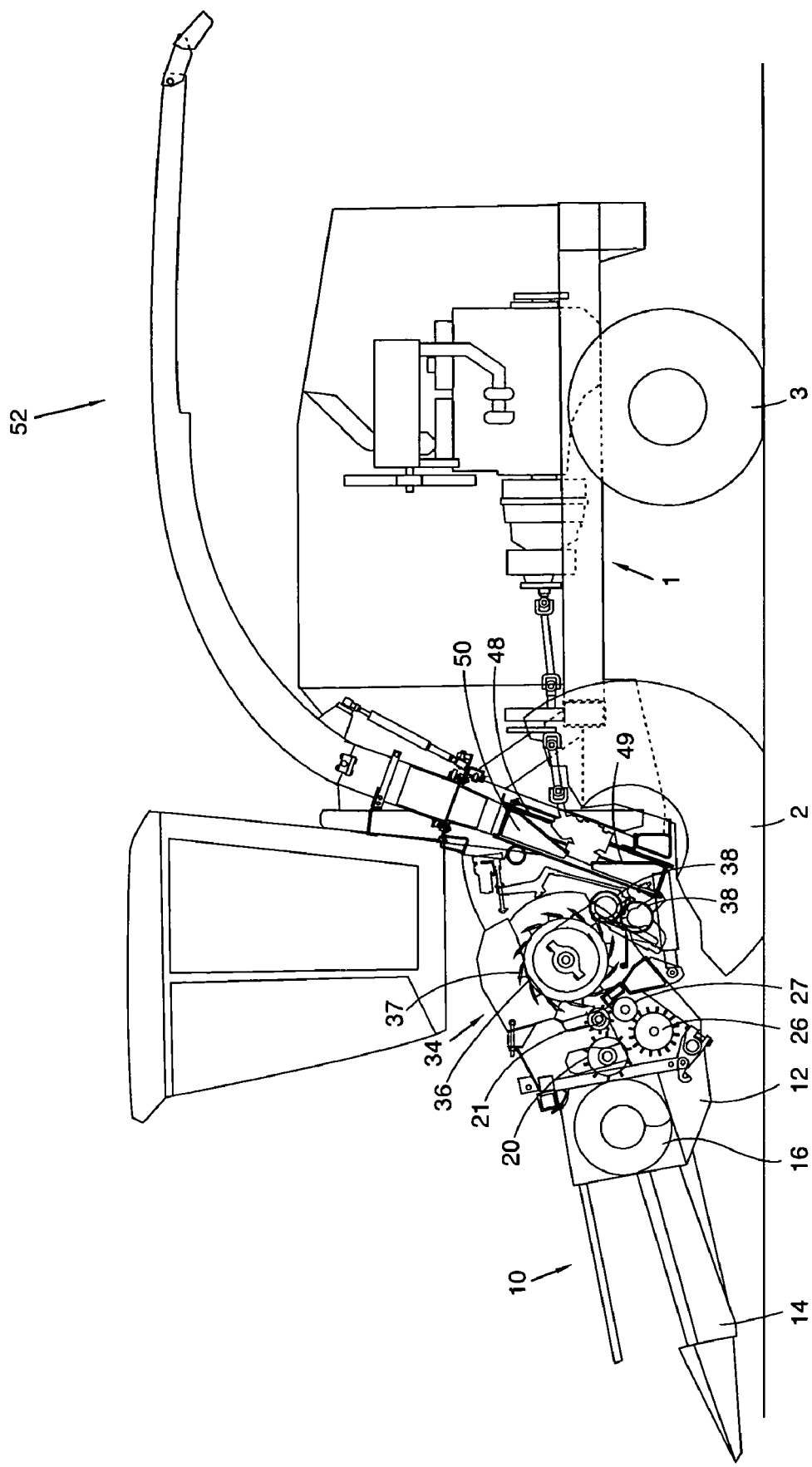
FIG. 1 is a side elevational view of a forage harvester, comprising a front unit, mounted to a main frame and a crop processing apparatus comprising a pair of crop processor roll assemblies.

With reference to FIG. 1, there is shown a forage harvester having a main frame 1 on which are mounted ground engaging traction wheels 2 and steering wheels 3. The forage harvester is shown equipped with a crop collecting apparatus, in the form of a row crop attachment 10, suitable for the harvesting of maize, but which can be replaced with a conventional windrow pick-up device or a conventional cutter bar attachment, depending on the type of crop to be harvested. Customarily, the row crop attachment 10 comprises an attachment frame 12, which supports a plurality of crop row units 14, operable to harvest maize stalks from the field and to convey the same rearwardly to an auger 16, which in turn delivers the crop material to the bite of feeder means installed in a front unit of the forage harvester.

The forage harvester has feeding means which comprise upper feeder means, including an upper forward feed roll 20 and an upper rear feed roll 21, and lower feeder means, including a lower forward feed roll 26, and a smooth, lower rear feed roll 27. The lower feed rolls 26, 27 are rotatably mounted in a lower feeder frame and the upper feed rolls 20, 21 are mounted in an upper feeder frame, to which the row crop attachment 10 is attached. The upper and lower feeder means rotate to convey the crop material in-between into a cutterhead frame 34 enveloping a cutterhead 36, which comprises a plurality of knives 37, generating a cylindrical peripheral shape or profile, when the cutterhead 36 is rotated.

The knives 37 co-operate with a fixed shearbar to cut the crop material to length. Behind the cutterhead 36, a crop processing apparatus is provided, which comprises a set of counter-rotating crop processor roll assemblies 38, mounted therein for cracking the whole kernels which are left in the chopped material. To this end, the two counter-rotating crop processor roll assemblies 38 may have a substantially cylindrical, fluted surface and be driven in opposite directions at a different circumferential speed. The cutterhead 36 projects the cut material into the bite of the crop processing apparatus. The crop processor roll assemblies 38 deliver the crushed maize kernels to an accelerator or blower rotor 49 which is installed within a blower housing 48. The blower rotor 49 comprises a plurality of paddles 50, which throw the material upwardly through the blower or accelerator outlet into a discharge spout 52, which can be positioned by an operator to direct the cut crop material as required, commonly into a wagon which is moving alongside or behind the forage harvester.

When maize is being processed, the rolls 38 are close together. As described in WO-A-01/47342, a fine adjustment of the spacing between the rolls can be provided in order to obtain optimum splitting of the maize. When maize is not to be processed, it is preferred that the crop processor roll assemblies 38 are removed from the crop flow. The movement of the roll assemblies 38 is preferably so large that both come substantially clear of the crop path.

Figure 2:
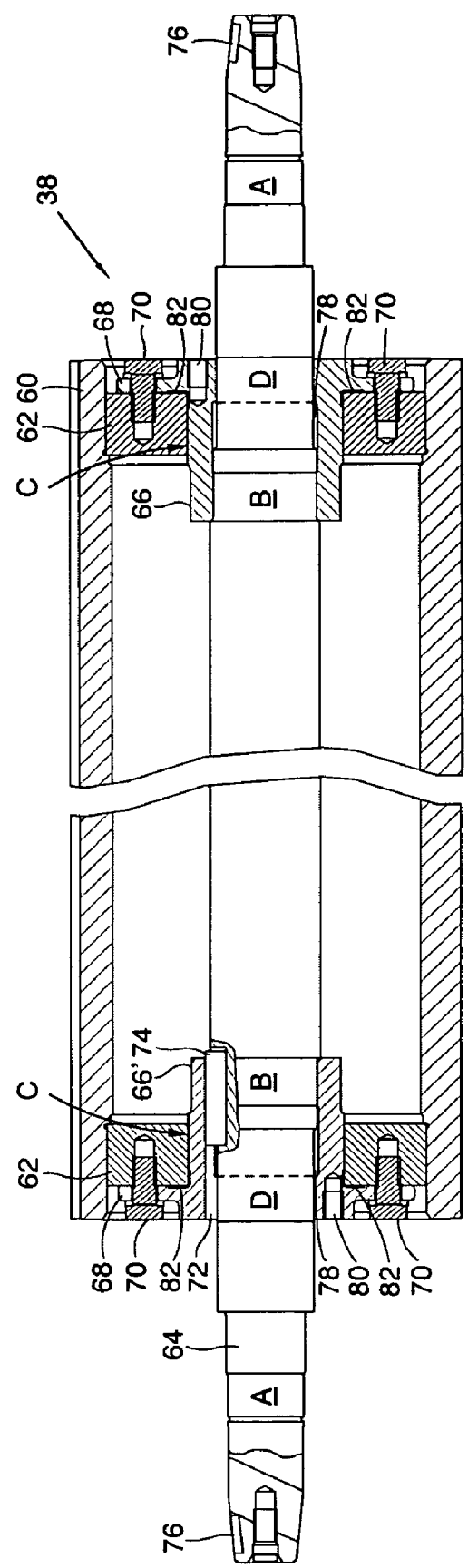
FIG. 2 is a longitudinal sectional view of one of the crop processor roll assemblies of FIG. 1.
Figure 3:
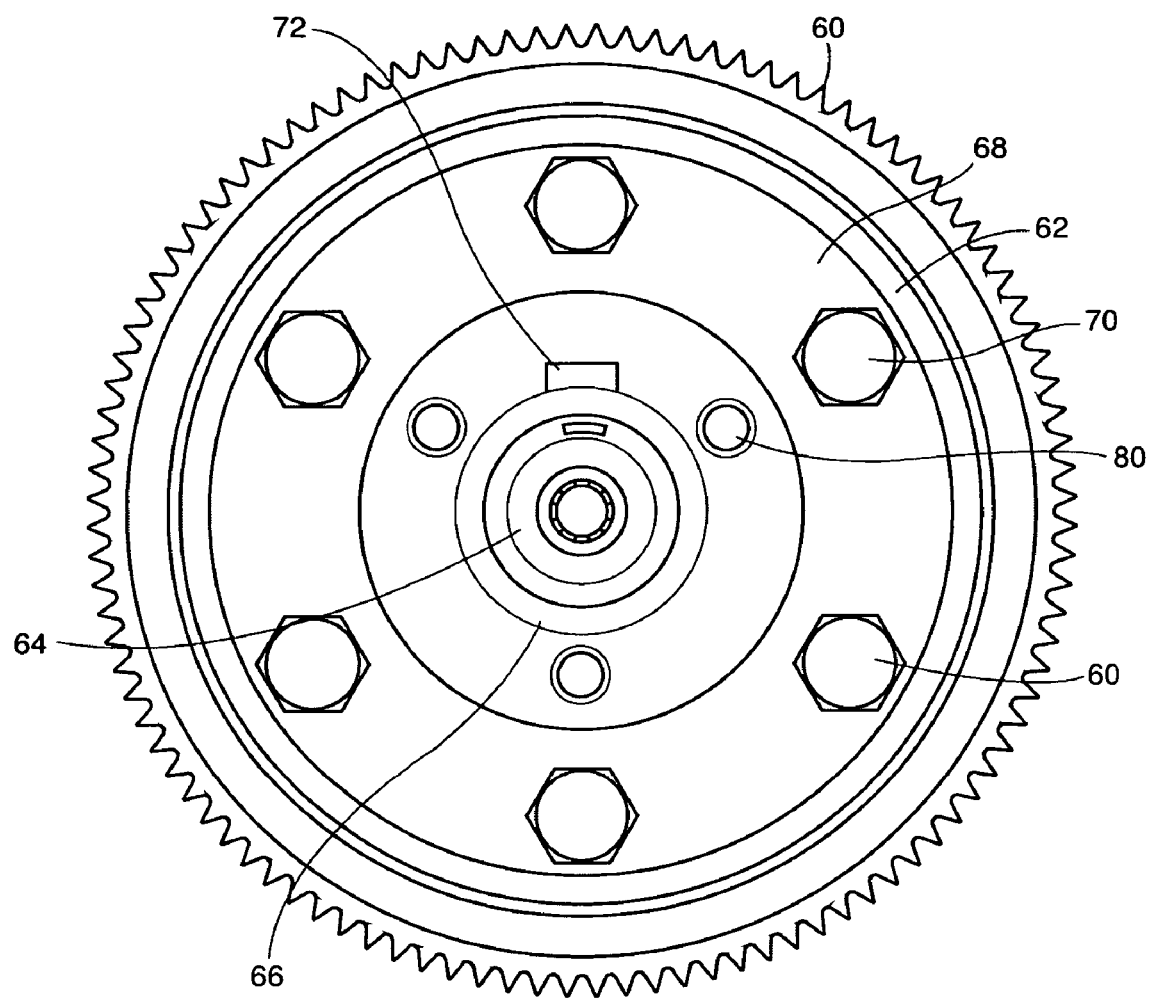
FIG. 3 is a perpendicular view of the crop processor roll of FIG. 2.

As shown in FIGS. 2 and 3, each crop processor roll assembly 38 comprises a hollow crop processor roll 60 having a generally cylindrical, fluted surface for engaging and cracking the kernels. The ends of the roll 60 are provided with annular end plates 62, which are secured in an appropriate, permanent manner, e.g., by a press fit or by welding to the inside of the roll 60.

The roll 60 is mounted over a shaft 64 and secured thereto by a pair of sleeves 66, 66' which are inserted between the shaft 64 and the holes in the end plates 62. The sleeves 66, 66' are provided with a flange 68, which can be secured against the outer face of the adjacent end plate 62 by a set of six bolts 70. One sleeve 66' is provided with a key way 72 for receiving therein a flat key 74, which is installed in a key seat in the shaft 64, for transmitting rotational power from the shaft 64 upon the roll surface. On the left and right hand sides of the roll 60, the shaft 64 is provided with seat sections A for the inner rings of bearings (not shown) that are mounted in moveable bearing housings of the type described in WO-A-01/47342. The shaft 64 comprises a conical end section with a key seat 76 for the assembly of a pulley (not shown), which provides the rotational drive to the shaft 64 and, via the sleeves 66, 66' the key 74 and the end plates 62, to the crop processor roll 60.

The mounting of the sleeve 66 will now be described in further detail. As the sleeve 66' is mounted to the shaft 64 in an identical manner, no separate description thereof will be given hereinafter. The inner end of the sleeve 66, which extends beyond the end plate 62 into the roll 60, is fitted over the shaft section B by an interference fit. Such fit may be a strong press fit, such as a H6/p6 or h6/P6 fit as defined by International Standard ISO 286-1. As this end of the sleeve 66 is not restrained by the end plate 62 or any other surrounding, solid part, its elastic deformation is not impeded as the sleeve 66 is being pressed into place.

Next to the shaft section B, the bore of the sleeve 66 is provided with a recess that constitutes an annular cavity 78, which allows for inward elastic deformation of the surrounding portion of the sleeve 66. The axial length of the recess is substantially equal to the thickness of the end plate 62. On the outside of the cavity 78, the sleeve is joined to the end plate 62 through a light press fit C, e.g., a H6/n6 or N6/h6 fit according to ISO 286-1. The outer diameter of the sleeve 66 has been slightly reduced in the area next to the flange 68, thereby realizing a further cavity 82 between the sleeve 66 and the bore of the end plate 62. Adjacent thereto, the rear face of the flange 68 has been turned out to a small depth over a limited diameter, such that the cylindrical cavity 82 continues in a radial direction between the end plate 62 and the flange 68. The cavity 82 reduces the axial length of the press fit area C, such that the latter does not extend axially beyond the position where the next shaft section D begins.

The outer end of the sleeve 66 is mounted over this section D of the shaft 64 through a further light press fit, which equally may be constituted by a H6/n6 or N6/h6 fit according to ISO 286-1. It will appreciated that there is no axial overlap between fit sections B and C and between sections C and D. This allows for elastic deformation of the sleeve 66 in the transition area between the section C, with an inward pressure fit, and sections B and D, with an outward pressure fit.

During assembly of the compressor roll 38, the sleeve 66 is forced simultaneously onto the shaft 64 and into the side plate 62. The use of a grease, preferably a water-resistant grease, on the inside and the outside of the sleeve 66, ensures that the latter can be removed later without damage to any of the bore in the side plate 62, the sleeve 66 or the shaft 64. This makes it possible to replace only the outer crop processor roll 62, when the flutes on its outer surface are worn and no longer capable of cracking the kernels over the full roll periphery. Three threaded holes 80 are provided in the outer face of each flange 68 for the provisional insertion of extraction bolts, which are used during the removal of the sleeves 66, using standard screw-type extraction tools.

Although the invention has been shown and described with reference to a particular preferred embodiment, the scope thereof, as defined by the following claims, is not limited thereto. Indeed, it will be understood by those skilled in the art that various changes and modifications can be thought of, without departing from this scope of the invention. For instance, this type of mounting can be used in a crop processor assembly wherein the present single shaft is replaced by a pair of two shorter shafts. It is also envisaged to vary the press fits, and for instance, to use the stronger fit adjacent the outer end of the sleeve 66 and the lighter fit adjacent the inner end. The press fit seat B has been shown on the inside of the end plate 62, but it is also possible to extend sleeve 66 on the outside of the end plate and to provide a press fit seat at this outer section of the sleeve.

What is claimed is:

1. A crop processor roll assembly for a forage harvester comprising:

A shaft;

A crop processor roll having a generally cylindrical surface for cracking kernels in crop material engaged by the surface and at least one end plate provided with a bore for receiving therein an end of the shaft;

At lest one removable mounting element for mounting the crop processor roll to the shaft; wherein the mounting element comprises a sleeve, the interior of which is joined to the shaft by an inner interference fit; and the exterior of the sleeve is joined to the roll by an outer interference fit, wherein the exterior of the sleeve comprises a recess outside the outer interference fit, providing an annular cavity between the sleeve and the bore of the end plate for allowing elastic deformation of the sleeve, wherein the sleeve is provided with a flange for affixing the sleeve to an outer face of the at least one end plate, further wherein the recess extends in a radial direction between the outer face of the at least one end plate and the flange.

2. A crop processor roll assembly according to claim 1, wherein the outer interference fit joins the sleeve to the one end plate and the inner interference fit is located at a position lengthwise inward or outward from the end plate.

3. A crop processor roll assembly according to claim 2, wherein the interior of the sleeve comprises a recess below the outer interference fit, providing an annular cavity between the sleeve and the shaft for allowing elastic deformation of the sleeve.

4. A crop processor roll assembly according to claim 3, wherein the outer interference fit is lighter than the inner interference fit.

5. A crop processor roll assembly according to claim 1, wherein the sleeve is joined to the shaft or the crop processor roll by a further interference fit.

6. A crop processor roll assembly according to claim 5, wherein the further interference fit is lighter than the inner interference fit.

7. A crop processor roll assembly according to claim 5, wherein the outer interference fit is provided between the inner interference fit and the further interference fit.

8. A crop processor roll assembly according to claim 7, wherein the flange is provided with threaded holes for the mounting of a disassembly tool for removing the sleeve from the assembly.

9. A crop processor roll assembly according claim 8, further comprising a flat key between the shaft and the sleeve for the transmittal of power from the shaft upon the crop processor roll.

10. A crop processor roll assembly for a forage harvester comprising:

A shaft;

A crop processor roll having a generally cylindrical surface for cracking kernels in crop material engaged by the surface and at least one end plate provided with a bore for receiving therein an end of the shaft;

At lest one removable mounting element for mounting the crop processor roll to the shaft; wherein the mounting element comprises a sleeve, the interior of which is joined to the shaft by an inner interference fit; and the exterior of the sleeve is joined to the roll by an outer interference fit; wherein the outer interference fit joins the sleeve to the one end plate and the inner interference fit is located at a position lengthwise inward or outward from the end plate; wherein the interior of the sleeve comprises a recess below the outer interference fit, providing an annular cavity between the sleeve and the shaft for allowing elastic deformation of the sleeve; wherein the outer interference fit is lighter than the inner interference fit, wherein the exterior of the sleeve comprises a recess outside the outer interference fit providing an annular cavity between the sleeve and the bore of the end plate for allowing elastic deformation of the sleeve, wherein the sleeve is provided with a flange for affixing the sleeve to an outer face of the at least one end plate, further wherein the recess extends in a radial direction between the outer face of the at least one end plate and the flange.

11. A crop processor roll assembly according to claim 10, wherein the sleeve is jointed to the shaft or the crop processor roll by a further interference fit.

12. A crop processor roll assembly according to claim 11, wherein the further interference fit is lighter than the inner interference fit.

* * * * *